April 14, 1953     E. C. ALLEN     2,634,950
COAL DRILL
Filed Aug. 8, 1949     2 SHEETS—SHEET 1
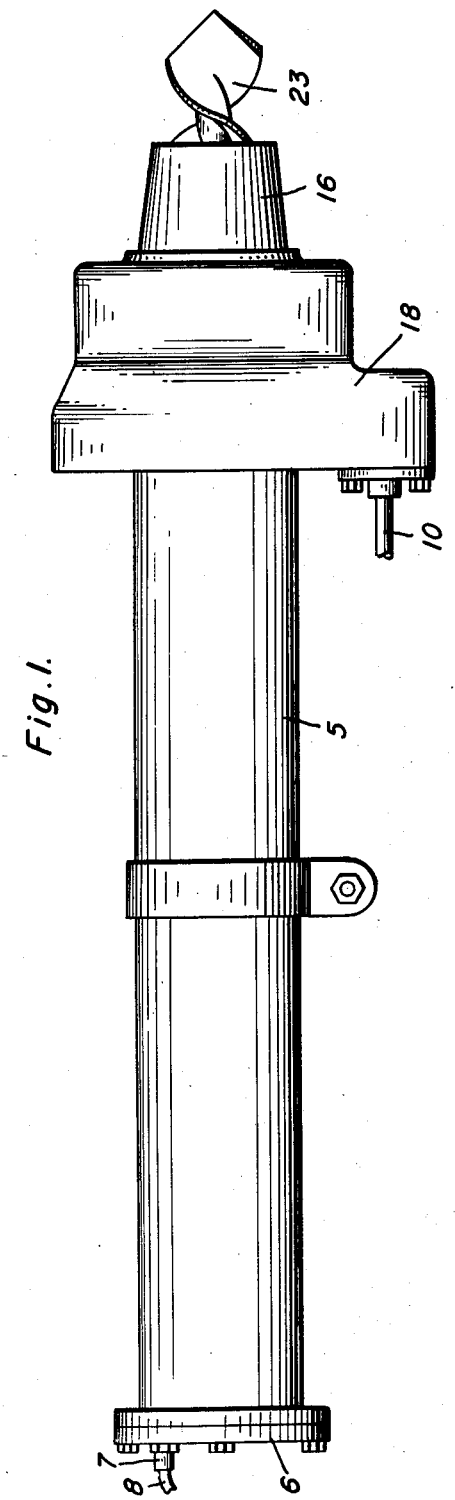
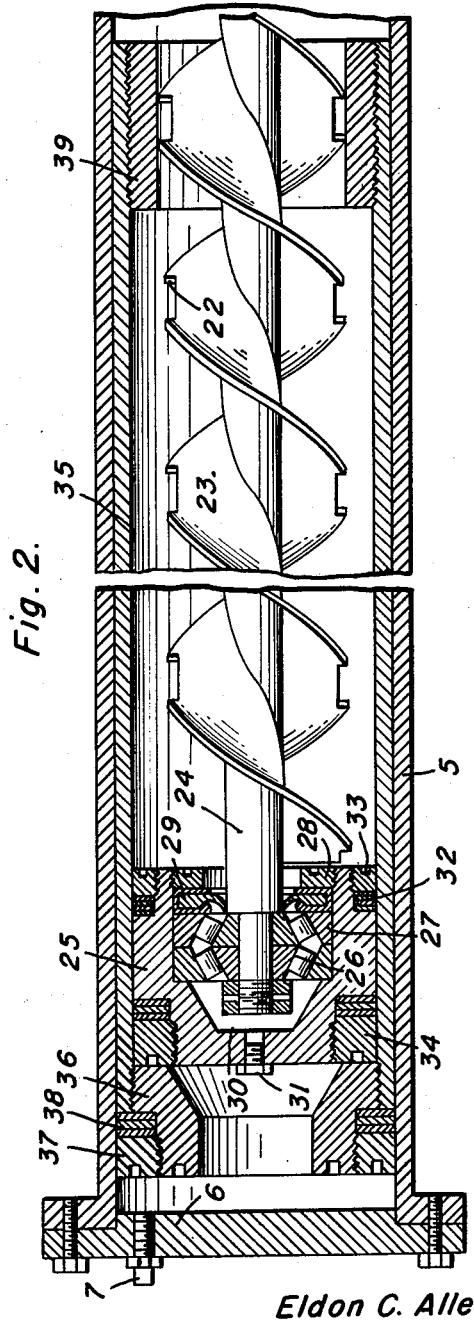
Eldon C. Allen
INVENTOR.

April 14, 1953  E. C. ALLEN  2,634,950
COAL DRILL
Filed Aug. 8, 1949  2 SHEETS—SHEET 2
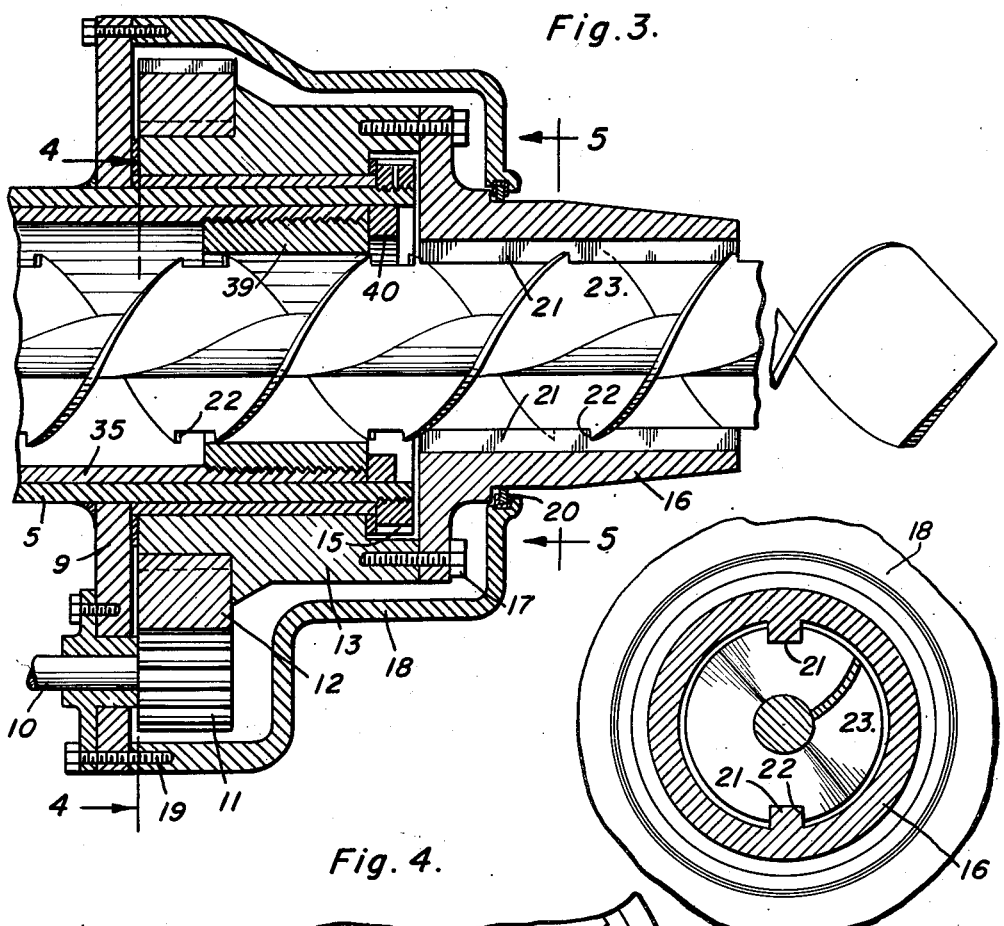
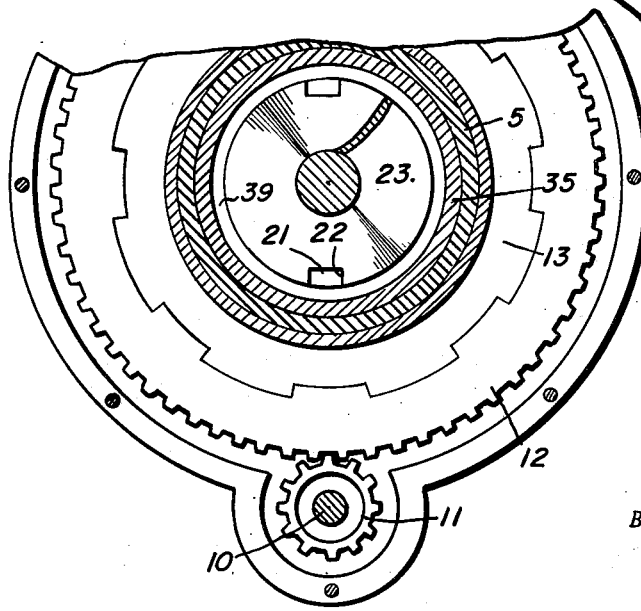
Eldon C. Allen
INVENTOR.

Patented Apr. 14, 1953

2,634,950

UNITED STATES PATENT OFFICE 2,634,950

COAL DRILL

Eldon C. Allen, Harrisburg, Ill.

Application August 8, 1949, Serial No. 109,157

3 Claims. (Cl. 255—22)

The present invention relates to new and useful improvements in coal drills of the auger type and more particularly to hydraulic means for advancing and retracting the auger without changing the direction of rotation thereof.

An important object of the invention is to provide a cylindrical housing into which the auger is retracted, providing drive means for the auger at the outer end of the housing to reduce whip and vibration in the auger; providing a sliding cylinder in the housing with a plunger working in the cylinder to advance and retract the auger and in which the rear end of the auger is journaled; and providing means for picking up the cylinder following an initial advancing movement of the auger to advance the cylinder therewith to enable travel of the auger the full length of the housing by a relatively short stroke of the plunger.

Another object is to provide novel drive means at the front end of the housing drivingly engaged with the periphery of the spiral blade of the auger and which provides a bearing for the auger.

A further object is to provide a device of this character of simple and practical construction, which is efficient and reliable in operation, strong and durable, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is an enlarged fragmentary longitudinal sectional view of the rear end of the housing taken on a line 2—2 of Figure 1;

Figure 3 is a similar view of the front end of the housing taken on a line 3—3 of Figure 1; and Figures 4 and 5 are transverse sectional views taken respectively on lines 4—4 and 5—5 of Figure 3.

Referring now to the drawings in detail, wherein, for the purpose of illustration, I have disclosed a preferred embodiment of my invention, the numeral 5 designates a cylindrical housing which is closed at its rear end by an end plate 6 having a nipple 7 therein for attaching a combined fluid pressure and suction line 8 thereto.

A flange 9 is welded or otherwise suitably secured on and adjacent the front end of housing 5 and in which is journaled a driven shaft 10 having a pinion 11 at its front end forwardly of flange 9 engaging a ring gear 12 suitably secured to a driving hub 13 rotatably held at the front end of the housing by a nut 15 threaded on the end of the housing. A rotary chuck 16 is secured to the front end of hub 13 by studs 17. A cover 18 encloses gears 11 and 12 and hub 13 with the rear end of the cover secured to flange 9 by studs 19 and a grease seal 20 is carried at the front end of the cover in engagement with the outer surface of chuck 16.

The chuck 16 is formed with a pair of internal keys or splines 21 in diametrically opposed relation to each other and are engaged in notches 22 at diametrically opposite edges of an auger blade 23 to provide a splined driving connection between the chuck 16 and auger blade 23 for rotating the auger during a sliding advancing and retracting movement thereof.

The rear end of the shank or shaft 24 of the auger is journaled in a plunger 25 by means of a roller bearing assembly 26 held in a recess 27 in the plunger by a retaining ring 28 with a packing 29 between the ring and the bearing assembly. A grease chamber 30 is formed at the rear of recess 27 behind the bearing assembly and is supplied with grease thru an opening closed by means of a plug 31. The plunger is provided with sealing rings 32 held in place by front and rear retaining rings or nuts 33 and 34.

The plunger 25 works in a cylinder 35 which is slidable in housing 5, the rear end of the cylinder having internal and external retaining rings 36 and 37 holding a sealing ring 38 in position on the cylinder against the walls of housing 5 and the internal ring 36 provides a stop engaged by plunger 25 during its rearward movement.

The front end of cylinder 35 is also provided with an internal annular front stop and bearing 39 for engagement by the plunger during its forward movement and in which the auger blade 23 rotates and slides with a working fit. A stop ring 40 is also suitably secured in the front end of housing 5 limiting forward movement of the cylinder.

In the operation of the device, a hydraulic or other fluid line is attached to nipple 7 for connection to a suitable pressure or suction means to supply fluid under pressure to the rear end of housing 5 behind plunger 25 or to evacuate fluid and create suction in the rear end of the housing.

Fluid pressure subjected to plunger 25 will move the plunger forwardly in cylinder 35 to advance auger 23 until the plunger reaches stop 39 to pick up cylinder 35 which then moves forwardly in housing 5 with the auger until the front end of the cylinder strikes stop ring 40 to limit further movement of the auger.

Auger 23 is rotated during its advancing movement by rotary chuck 16 provided with the internal keys 21 engaging the notches or keyways 22 in the edge of the spiral blade of the auger.

During advance of the auger blade 23, until the plunger 25 engages the front stop and bearing 39, said stop and bearing 39 braces the auger radially progressively in one direction, that is from an intermediate point to its journaled end. During retraction of the auger blade 23, until the plunger 25 engages the internal ring or stop 36, said front stop and bearing 39 similarly braces the auger, progressively in the opposite direction, from the journaled end of the auger to said intermediate point. Advance and retraction of the cylinder 35, by the plunger 25, causes said front stop and bearing 39 to reciprocate, or travel, along said auger into relatively opposite extreme positions to brace the auger as described. As will be understood, the reciprocating or traveling front stop and bearing 39 provides for bracing the auger inside the housing 5 with a minimum of frictional resistance to rotation and feed of the auger, and the cylinder 35 provides a carriage for said front stop and bearing 39.

The auger is retracted by evacuating fluid from the rear end of the housing behind plunger 25 by means of a suction line attached to nipple 7 to pull plunger 25 rearwardly.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A drill comprising a tubular stationary housing having a closed rear end, a tubular chuck rotatably mounted on the front end of said housing, an auger endwise movable in opposite directions in said housing to advance and retract the same and having a spiral blade slidably extending through and out of said chuck, spline connections between said chuck and blade for rotating said blade by rotation of said chuck during sliding of said blade through the chuck, a sleeve bearing in said housing for bracing said auger against lateral flexing during advance and retraction of said auger and which is slidable along said blade for advance and retraction relative to said auger, means for advancing and retracting said auger including a plunger in said housing having advancing and retracting movement in the housing, said plunger during advance movement thereof engaging said bearing to advance the bearing, means in the housing operatively connecting the plunger to the bearing to retract the bearing by retraction of the plunger comprising an elongated member substantially one-half the length of the housing endwise movable in the housing and having the sleeve fixed to one end thereof and a stop fixed to its other end engaged by the plunger during retraction of the plunger, and means for rotating said chuck.

2. A drill according to claim 1, said second named means comprising a cylinder endwise slidable in the housing with the plunger working therein between said sleeve bearing and stop.

3. A drill according to claim 1, said second named means comprising a cylinder endwise slidable in the housing with said plunger working therein between said sleeve bearing and stop, said sleeve bearing and stop being threaded into opposite ends of the cylinder.

ELDON C. ALLEN.

References Cited in the file of this patent

UNITED STATES PATENTS

| Number | Name | Date |
| --- | --- | --- |
| 825,857 | Moran et al. | July 10, 1906 |
| 1,878,036 | Vodoz | Sept. 20, 1932 |
| 1,932,068 | Englebright et al. | Oct. 24, 1933 |
| 2,226,643 | Swansen | Dec. 31, 1940 |
| 2,478,233 | Brown | Aug. 9, 1949 |
| 2,509,410 | Applegate | May 30, 1950 |

FOREIGN PATENTS

| Number | Country | Date |
| --- | --- | --- |
| 246,458 | Great Britain | July 29, 1926 |
| 441,152 | Great Britain | Jan. 14, 1936 |